(12) United States Patent
Elsawah

(10) Patent No.: US 9,796,144 B2
(45) Date of Patent: Oct. 24, 2017

(54) INTERNAL TIRE REPAIR DEVICE AND METHOD

(71) Applicant: Ziad Ahmed Mohamed Ali Hussein Elsawah, Toronto (CA)

(72) Inventor: Ziad Ahmed Mohamed Ali Hussein Elsawah, Toronto (CA)

(73) Assignee: Ziad Ahmend Mohamed Ali Hussein Elsawah, Toronto (CA)

( * ) Notice: Subject to any disclaimer, the term of this patent is extended or adjusted under 35 U.S.C. 154(b) by 370 days.

(21) Appl. No.: 14/464,671

(22) Filed: Aug. 20, 2014

(65) Prior Publication Data

US 2016/0052349 A1    Feb. 25, 2016

(51) Int. Cl.
| | |
|---|---|
| B60C 17/00 | (2006.01) |
| B60C 17/10 | (2006.01) |
| B60C 19/00 | (2006.01) |
| B60C 19/12 | (2006.01) |
| B29C 73/22 | (2006.01) |
| B29C 73/16 | (2006.01) |

(52) U.S. Cl.
CPC ............ B29C 73/22 (2013.01); B29C 73/166 (2013.01); B60C 19/122 (2013.01)

(58) Field of Classification Search
CPC  B60C 5/00; B60C 17/00; B60C 17/10; B60C 19/00; B60C 19/12
See application file for complete search history.

(56) References Cited

FOREIGN PATENT DOCUMENTS

| CN | 1101926 | * | 4/1995 |
|---|---|---|---|
| KR | 2013072491 | * | 7/2013 |

OTHER PUBLICATIONS

Machine translation of KR 2013072491, 2013.*

* cited by examiner

*Primary Examiner* — Justin R Fischer

(57) ABSTRACT

A device and method for storing tire repair material in or around the wheel barrel of a tire. Also, a device and a method for repairing a compromised tire using tire repair material stored in or around the wheel barrel of a tire. In some embodiments, the means for storing the tire repair material in or around the wheel barrel may comprise non-interconnected bays. Device embodiments may also comprise a tire repair material applying means (for example, means utilizing some form of propulsion and/or spraying). Thus, in some embodiments, the tire repair material may be applied to a compromised section of the inside surface of the tire, originating from the direction of the wheel barrel. In some embodiments, the device may also comprise a means for detecting a compromised tire and the punctured section thereof, as well as a means for signaling commencement of application of the tire repair material.

4 Claims, 4 Drawing Sheets

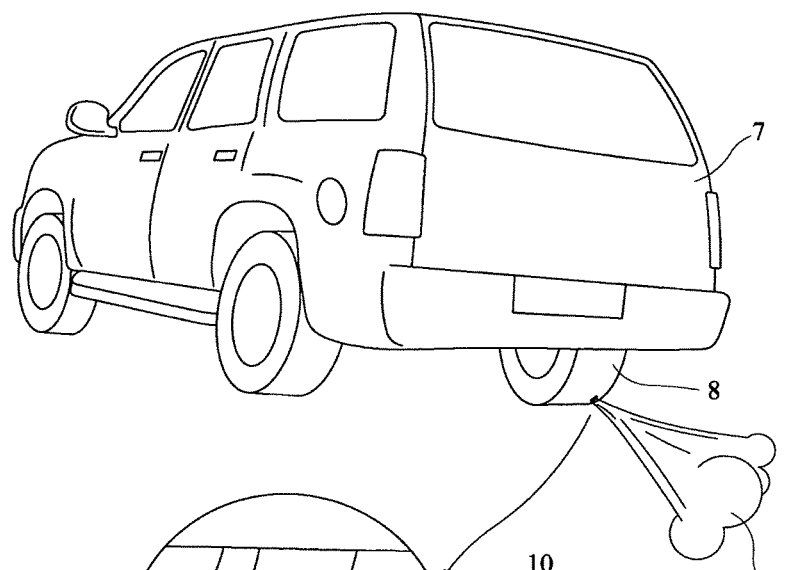
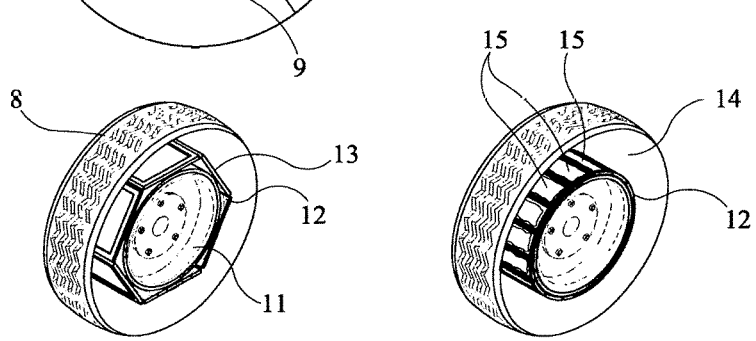
FIG. 1
FIG. 2
FIG. 3

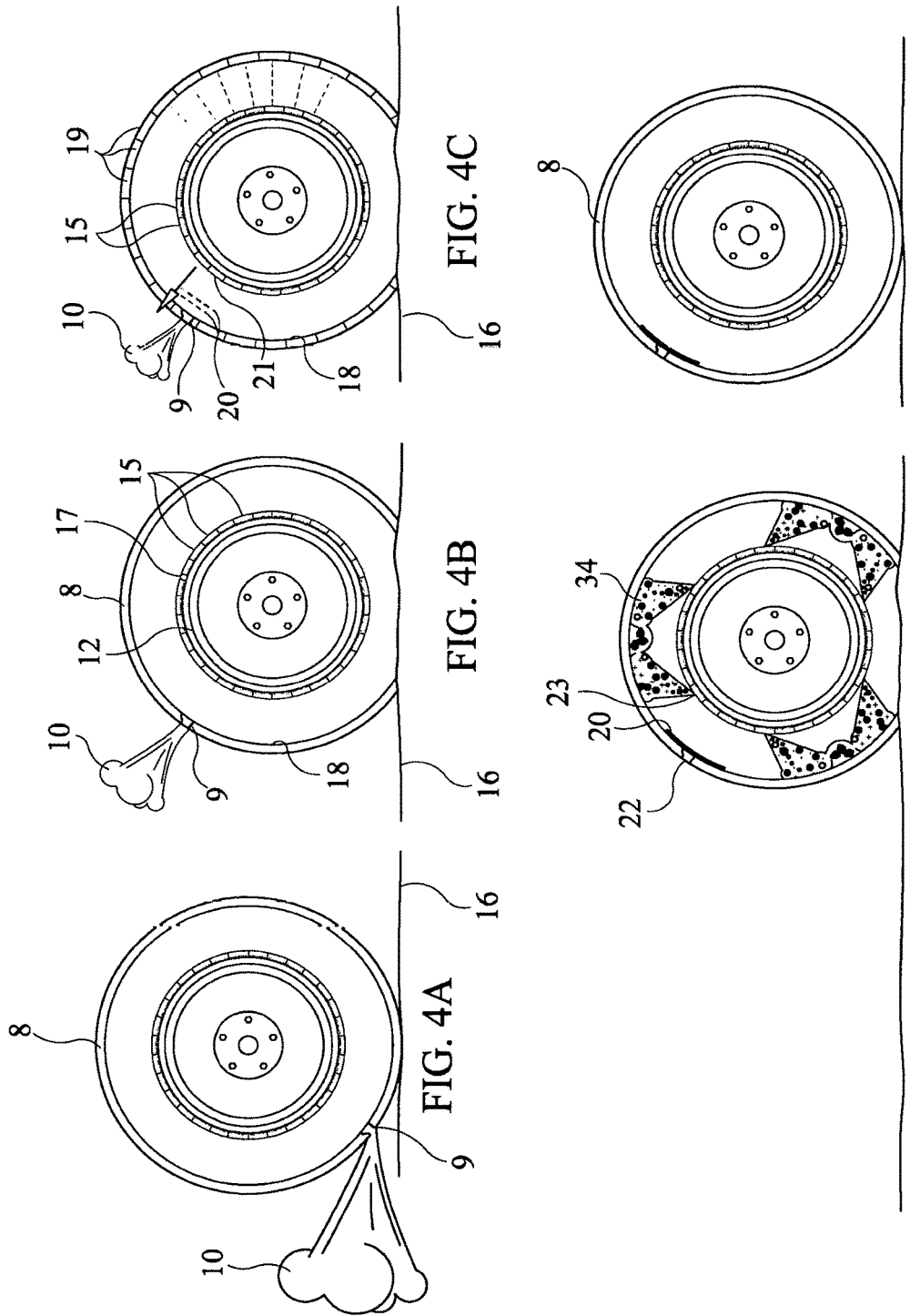

INTERNAL TIRE REPAIR DEVICE AND METHOD

FIELD OF INVENTION

The present invention is in the technical field of automotive engineering and specifically, tire repair. More particularly, the present invention relates to methods and devices for repairing punctured tires and/or for storing tire repair material from a reference point internal to a tire coupled to a wheel.

BACKGROUND OF INVENTION AND DESCRIPTION OF PRIOR ART

A common problem of pneumatic tires is that, while they may be designed to allow smoother riding and higher speeds, the integrity of their membranes more easily and often becomes compromised by, for example, being punctured. Although some tire designs may have thicker tire tread and/or incorporate materials resistant to puncturing (such as polyurethane), due to the limited speeds such tires may often travel, and due to a possibly-less comfortable/smooth ride, and/or the limited puncture resistance actually obtained by such products, standard pneumatic tires remain common for many normal vehicles. However, traveling in vehicles with normal pneumatic tires that have been punctured can be dangerous and cause additional damage to the tire and even other parts of the vehicle (such as the wheel). Moreover, repairing a compromised tire by the traditional and common method of stopping a tire from rotating and removing it using a jack and a tire wrench so it can be repaired (often by patching or plugging, or both) has well-known drawbacks—such as, for example, inconvenience, requiring an excessive amount of time, and jeopardizing the safety of the driver and or passenger. For example, dangerous environmental conditions outside the vehicle such as extreme weather, careless drivers, or a passerby with malevolent motives, can all place at risk the well-being of the driver and passengers.

Some devices for repairing tires have been created to allow temporary repair and inflation of a tire to occur more expeditiously, without having to remove the compromised tire (i.e., decouple the tire from the wheel). For example, a canned tire inflator device attaches to the tire valve, with compressed refrigerant forcing the can's contained sealant into the tire where it may block a puncture, and thereby allow the tire and vehicle to travel some minimum distance to a presumably safer destination. While such devices may be useful in performing the intended function, they also have drawbacks. For example, the sealants used in such devices often contain harmful chemicals, and due in part to the fact that the sealants may enter the hollow tire cavity from a point outside the tire cavity and the wheel, said harmful chemicals may sometimes shoot out of the valve stem at a high pressure level, which might cause injury to the operator and/or others. In addition, such sealant has been known to block or destroy certain technology found in valve stems, and the temporarily-repaired tire must normally still be either fully repaired (using a plug or patch) or entirely replaced with a new intact tire. Furthermore, although the canned tire inflator (and similar devices) may effectively and laudably reduce time required of an operator outside a vehicle, it nevertheless still requires that the operator stop and exit the vehicle for a period of time, thereby subjecting the operator for some amount of time to the same potentially dangerous conditions mentioned above.

Due mostly to safety reasons similar to those mentioned above, some tire designs, often called run-flat tires, have been created to allow a vehicle to continue travel after a tire has become compromised, thus avoiding a driver from having to stop and exit the vehicle altogether. Some self-sealant run-flat tires, for example, may consist of extra lining inside the tire, which lining may incorporate sealant material for sealing punctures of a certain maximum size. Other run-flat tires may incorporate support rings that attaches to the wheels or sidewall reinforcements (of the tires) that may support the weight of the vehicle. Some run-flat tires may include, for example, wheel well fillers or safety bands, which may be mounted inside the wheel wells or tires. One run-flat tire design may include a carcass of un-interconnected inflatable hollow elements that, after one of the hollow elements has been punctured or damaged, may be intended to allow the vehicle to continue traveling while the run-flat tires are in inflated states. Such run-flat tires may also entail obvious disadvantages, such as for example: weighing more than other tires and thereby reducing gas mileage, increasing rolling resistance, providing a rougher ride, and not allowing traveling at higher speeds. In addition, some run-flat designs have more specific application for military use and may not be practical or possible for broader use by civilian vehicles.

Although most run-flat tires and devices, as opposed to the canned tire inflator, do not normally allows tires to be re-inflated (but rather as the name suggests are intended to allow the tires to travel in an at least partially deflated state), some other devices allow inflation of not only a stationary tire, but also a moving tire, or at least without removing/decoupling a tire from a wheel. For example, some older "automatic tire inflation systems" have incorporated long wand-like conduits protruding from an opening in the vehicle frame near the wheel, for connecting to the valve stems of the tires. Other devices of a similar genre have included air channels or lines running through the wheel rim, or allowed engagement with a hub cap or axle, or similar vehicle part. Few inflation devices are entirely internal to the tire, or allow inflation to occur by means that are internal to the tire, and without requiring connecting the valve stem.

Some automatic tire inflation systems and some devices for repairing tires, in order to determine whether tire inflation and/or repair is necessary, may incorporate some means for detecting tire pressure or temperature of a tire. For example, some sensors may detect whether a tire has been compromised by measuring and comparing the tire pressure and/or thermal radiation (temperature) of one tire with that of another tire. A few such detection devices may allow "co-movement" with a wheel of a vehicle (for example, by fastening to the outside of the wheel or valve) to allow monitoring of air pressure to take place even during operation of the vehicle. Among other disadvantages, such placement may possibly cause asymmetrical mass distribution along the wheel, and resulting degradation of wheel balance.

Some wireless sensors also have been created for sensing when a tire has been compromised or punctured, which may be operated using a wireless energy source, such as a battery or a transducer, which (transducer) may receive power either inductively, through radio frequency energy transfer, or capacitively. A few tire pressure monitoring systems may also incorporate a tire pressure sensor placed inside a tire. Nevertheless, few if any such devices detect punctured portions of a tire from a reference point that is internal to the tire coupled to a wheel.

SUMMARY OF THE INVENTION

One objective of the device and method described herein is to store tire repair material internal to a tire coupled to a wheel. When a tire is coupled to a wheel (usually held between flanged outer and inner rims and the beads thereof), the wheel barrel surface is advantageously normally not obstructed by the tire or by anything at all, and may therefore provide a location around which tire repair material may be stored. Thus, one embodiment described herein is for storing tire repair material in or around the wheel barrel.

Moreover, since when a tire is coupled to a wheel the wheel barrel surface faces the inside surface of the tire, there is normally an unobstructed path between tire repair material stored on or around the wheel barrel surface and the section of the inside surface of the tire that may correspond to a compromised portion of the tire. Thus another objective of the device and method described herein may be to allow repair of a tire utilizing tire repair material stored in or on the wheel barrel, and having an unobstructed path to the inside surface of the tire. Another objective may be that such repair takes place without removal of the tire from the wheel, and a further objective may be for such repair to take place automatically, without requiring that an operator exit a vehicle to perform the repair (or some part thereof) and in some embodiments without requiring any operator action whatsoever. Some embodiments may even have the objective of allowing repair to occur while the tire, wheel, and vehicle are in a state of movement.

Some device and method embodiments may also have the objective of utilizing a specific and limited portion of tire repair material to repair only the particular compromised portion(s) of the tire. Applicant is aware of no prior art device or method that describes segmented non-interconnected bays of material for repairing a tire that are internal to the tire, where each bay may have a predetermined function of assisting in repairing a certain section of the inside surface of a tire. Thus, another related objective of certain embodiments may be to detect the particular section (s) of a tire where a tire has been compromised, and utilize said information so that repair of said section(s) may occur using an as needed amount of tire repair material in closer proximity to said compromised portion. Some other aspects of device and method embodiments may have the objective of at least partially inflating the tire using features (in some embodiments) also located internal to the tire, and a related objective may be for such inflation to occur while the wheel is in motion.

Described herein may be a device and method for repairing a compromised tire comprising material located in or on or around the wheel barrel, for repairing compromised (e.g., punctured) portion(s) of a tire, said tire repair material for being applied to the inside surface (or more specifically, a section thereof) of the compromised tire so that air is prevented from escaping through the compromised portion (s) of the tire. Some embodiments may include symmetric distribution of the tire repair material in or on or around the wheel barrel to assist in preventing degradation of wheel balance. Device and method embodiments may also comprise a compromised tire detection means, which in some embodiments may be intended to detect the substantially precise or general location of the compromised portion of the tire (e.g., the puncture location). Other embodiments may also comprise a means for signaling commencement of the application of the tire repair material to a section of the inside surface of the tire corresponding to the compromised portion of the tire. Some device and method embodiments may allow the detection itself of the compromised portion of the tire to automatically initiate application of the tire repair material to the section of the inside surface of the tire corresponding to the compromised portion of the tire.

In some embodiments, some or all of the components (and/or variations thereof) described herein may together form a module retrofitted for use with an industry standard wheel barrel, or comprise a unitary novel wheel or wheel barrel, which both may be located internally to the tire (when mounted on a wheel). Such an internal location may present certain benefits, such as facilitating repair of the tire without having to remove the tire from the wheel (and without exposure to potentially harmful sealant chemicals), and in some embodiments while the wheels and vehicle are in motion. In addition, in some embodiments, it is anticipated that repair of the tire may be substantially effective as plugging or patching and thus may not require an additional more "full" repair of the tire.

In certain embodiments, the tire repair material may be stored in a plurality of segmented non-interconnected bays, which bays may be on or incorporated into the wheel barrel (that is, along the width of the wheel—not necessarily along the wheel face but rather in between the outer and inner rims). In certain embodiments, each bay may be intended to allow repair to occur in a particular section of the inside surface of the tire. In some such embodiments, after the means for detecting the compromised portion of the tire detects the compromised portion of the tire, the means for signaling initialization of the application of the tire repair material may signal to the means for applying the tire repair material to begin applying the tire repair material, but not necessarily all the tire repair material—rather only material in a particular bay corresponding to the section of the inside surface of the tire having the compromised portion of the tire.

Tire repair material variations may comprise those materials that are known in the art for repairing tires, such as sealants comprising soft polymers. In addition, in some embodiments where such tire repair material may be stored in a bay, the bay may compromise several different layers of such materials, which may allow the tire repair material to be applied to the inside surface of the tire (and specifically the section of the inside surface corresponding to a compromised portion) in a predetermined fashion. For example, in one embodiment, a topmost and first applied layer of tire repair material may fill in a compromised portion of the tire, and the second or next layer may also fill in the same compromised portion but over the first layer. Although it is anticipated that tire repair material applying means embodiments may vary, in one embodiment a bay may comprise second layer of material comprising sodium azide (NaN3) with potassium nitrate (KNO3), or some other tire repair material applying means embodiments that may utilize propulsion or explosively push the tire repair material towards the compromised portions of the tires (such as holes that have been punctured in the tire and/or cracks). Other tire repair applying means, by way of example, may utilize spraying. For example, air or nitrogen for the propulsion and/or spraying of the repair materials may in some embodiments be sourced locally on the wheel or universally in a pressure source elsewhere in/on an automobile (which may be directed to the wheel by some sort of connection, such as a plastic link or tube, and/or an airtight revolving structure that may connect with all spraying endpoints). In some embodiments, the explosive reaction may be initiated by the compromised tire detecting means and the means for signaling initiation of the application the tire repair material by for example, triggering the release/production of nitrogen or other gas to propel tire repair material towards the compromised area. Pressure differential, and to a lesser extent centripetal force, may also assist in pushing the tire repair material outwardly toward inside surface of the tire corresponding to the compromised area. Different embodiments may comprise bays of multiple layers of tire repair material that may be sequentially applied. For example, in one embodiment additional or subsequently-applied layers of tire repair material may comprise slower-setting glue mixed with rubber for elasticity, or even substantially the same tire repair material as previously applied.

Compromised tire detecting means embodiments may include a variety of methods and devices, including for example pressure or thermal radiation sensors, and infrared technology. In addition, some embodiments may comprise such means for not only detecting that a tire has been compromised, but also for identifying which particular section of the tire has been compromised. Moreover, it is anticipated that some compromised tire detecting means embodiments may be located to move in the same frame of reference as the wheel—for example, installed along the wheel barrel like the bays. For example, one particular embodiment may comprise independent infrared sensors each assigned to a material bay or several material bays and to have position(s) adapted for monitoring each section of the inner surface of the tire to determine whether a puncture has occurred. Such compromised tire detecting means may also be powered by devices and manners known in the art such as battery, traducers, etc.

The means for signaling initiation of the application of the tire repair material may comprise, in one embodiment, an on-board computer with sufficiently fast processing capability to receive the detection signal from the compromised tire detecting means, and then to send an electronic signal to the appropriate material bay and/or tire repair material applying means having the correct angular position(s) for applying tire repair material to the section of the inside surface having the punctured or otherwise compromised portion, all within a required range of time. In one embodiment, it is anticipated that this detection and repair process may occur automatically upon detection of a compromised tire due to the compromised tire detecting means.

An additional feature of some embodiments of the invention, due to the escape of some air from the tire after the tire has been compromised, may include a means for at least partially inflating the tire after the tire repair material has been applied to the inside surface of the tire. Such means might include those known in the art, and in addition, potentially novel means for inflation located internally to the tire, thus allowing inflation without requiring connecting the valve stem. For example, one such potentially novel means may include an additional layer of a material bay or additional material bays comprising material for inflating the tire internally—in particular, it is anticipated that nitrogen gas might be used for inflation purposes.

Additional embodiments may further comprise a means for installing and removing the device embodiment that is compatible with existing and prevailing methods for placing tires on wheels. For example, some embodiments may further comprise a means for assisting in mounting or coupling a tire to a wheel device embodiment of the invention. Other embodiments may comprise means wherein after the tire is coupled/mounted to the wheel, components of the wheel device for repairing a tire in a manner described above, such as those configured for holding or storing tire repair material and applying it to the inside surface of the tire, are subsequently (after the tire is installed/mounted) positioned for performing said intended function. For example, in some embodiments, the components for applying the tire repair material to the inside surface of the tire may be positioned along the wheel barrel surface (or from a point originating from the wheel barrel) after a tire of the type having a hollow tire body that is installable on a wheel is mounted/installed/coupled to the wheel. More specifically, in one embodiment, after the tire is mounted to the wheel, at least one opening may be provided along the surface of the wheel barrel, allowing components for applying the tire repair material to the inside surface of the tire and/or component(s) for holding the tire repair material to be situated or moved therethrough for performing their intended function(s), or situated or moved for performing their intended function(s) through the opening(s). In one contemplated embodiment, said opening(s) may be closed except when the components for applying the tire repair material to the inside surface of the tire are performing their applying function. In other embodiments, the tire repair material applying means may be moved through the opening(s) and situated in at least one predetermined and more static position(s) along the wheel barrel surface.

For example, in one embodiment, the wheel device may divide along the circumferential direction, providing an opening, and the components for applying the tire repair material to the inside surface of the tire and the component(s) for holding the tire repair material may be raised through the opening. In other embodiments, the wheel device may be comprised of several sections (for example, the area of the wheel between the inner and out rim may be segmented into two parts in the axial direction and two or more parts in the circumferential direction) for allowing the components for applying the tire repair material to the inside surface of the tire and/or component(s) for holding the tire repair material to be properly positioned, and in one particular embodiment, said components may comprise one or several concentric arc sections for placement over and for placement on or fastening to the wheel barrel. In one embodiment, a means for such placement, opening and/or dividing may also be provided, such as a genre of lever(s), which in one embodiment, may form part of the wheel and in some variations be located at least partially opposite of the wheel barrel and facing the hub. Some lever embodiments may be configured to move the segments of the wheel (in embodiments comprising said segments) so that an opening is formed, and/or configured to raise the components for applying the tire repair material to the inside surface of the tire and/or component(s) for holding the tire repair material, which components in one embodiment may together comprise a tire repair module, to be positioned to perform the intended function(s)—for example, positioned so that the components for applying the tire repair material to the inside surface of the tire face said inside surface. Said lever embodiments may take various forms, and in some embodiments may comprise the shape of an arc following the contour of inner side of the wheel. In one embodiment, the lever may assist in accomplishing the aforementioned functions in a motorized and (in an additional embodiment) automatic manner.

The above description and listed alternative embodiments are considered that of some embodiments only. It is understood that the embodiments shown in the drawings and described below are merely for illustrative purposes and not intended to limit scope. For example, in addition to wheel device embodiments comprising among other components a wheel barrel, in some embodiments, the wheel barrel comprising the components for storing the tire repair material and/or the components for applying the tire repair material, may be retrofitted to an existing wheel, where said wheel barrel may be formed to the tire at the time the tire is fabricated. Other device embodiments may also comprise a self-repairing tire, comprising the wheel, wheel barrel, and tire, functioning together as an integral unit. Thus, other alterations and modifications and such further applications as would occur to those skilled in the relevant art(s), are also contemplated.

Additional embodiments may further comprise a tire installation facilitating means. Furthermore, said means may comprise at least one closeable opening in the surface of the wheel barrel.

BRIEF DESCRIPTION OF THE DRAWINGS

FIG. 1 illustrates a vehicle having a punctured tire.

FIG. 2 is a side perspective cutaway view of a tire coupled to a wheel and a means for storing tire repair material around the wheel barrel.

FIG. 3 is another side perspective cutaway view of a tire coupled to a wheel and several bays of tire repair material stored around the wheel barrel.

FIGS. 4A-4E are cutaway side views of a tire coupled to a wheel, illustrating different stages of a method for repairing a punctured tire using tire repair material stored around the wheel barrel.

DETAILED DESCRIPTION OF THE PREFERRED EMBODIMENTS

Figure 5A:
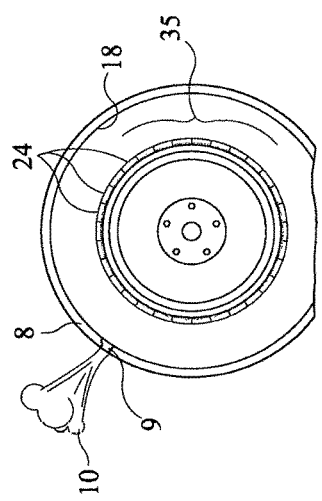
FIGS. 5A-5F illustrate several stages of repairing a punctured tire using a first tire repair device embodiment.

"Compromised" and "punctured" when used in connection with a tire and/or sections or portions thereof may at times both be defined herein interchangeably, and broadly, to mean any state allowing air to escape out of the tire membrane. "Wheel barrel" is defined to comprise not only the surface of the wheel barrel facing the inside surface of the tire when the tire is coupled to the wheel, but also a portion underneath said surface and potentially to the sides of said surface; in some instances (but not always) said portion underneath the wheel barrel surface and yet comprising the wheel barrel may form a part of the wheel, and in other instances may comprise a piece separate from the wheel, which separate piece may mount over the wheel. The definition of "coupled" herein includes mounted and installed. It should be reiterated that the embodiments described in the figures and in the following description are those of a few embodiments only. Such other embodiments that would be apparent to those skilled in the relevant art(s) to which the invention pertains are also contemplated herein.

Turning to the drawings, FIG. 1 illustrates a problem frequently and inconveniently encountered by vehicle operators: a vehicle 7 having a punctured tire 8. Since the tire 8 has been compromised, or in other words, a portion of the inside surface thereof has been punctured 9, air 10 inside the tire 8 may escape, allowing the tire 8 to deflate.

FIG. 2 illustrates a tire 8 coupled to a wheel 11, the wheel 11 comprising a wheel barrel 12, and also a device embodiment for storing tire repair material 13 in or around the wheel barrel 12. Said device embodiment may vary according to design and preference and intended usage but in one embodiment 14, shown in FIG. 3, may comprise a plurality of bays 15 of tire repair material stored around or in the wheel barrel 12, adapted to the contour of the wheel barrel 12 to better allow symmetrical distribution of weight.

The devices 13 and 14 of FIGS. 2 and 3 may have a number of possible applications, one of which is a method of tire repair shown in FIGS. 4A-4E. FIG. 4A illustrates a tire 8 spinning over a surface 16 and resulting in a compromised portion 9 of the tire 8, and air escaping from the tire 8 and the tire 8 beginning to deflate, as shown in FIG. 4B, and said compromised portion 9 of the tire being detected by any compromised tire detection means such as a sensor 17. The bays for storing tire repair material 15 may be segmented and non-interconnected, and located internally to the tire 8 coupled or installed or mounted to the wheel 11. Between the bays 15 and the inside surface 18 of the tire 8 may be space devoid of any solid objects, which space might provide basically unobstructed paths for applying tire repair material originating from the direction of the wheel barrel 12. In certain embodiments, such as that shown in FIG. 4C, the tire repair material 20 stored in each bay 15 may be intended to allow repair to occur to a particular section 19 of the inside surface 18 of the tire 8. Thus, after the means for detecting 17 the compromised portion 9 of the inside surface 18 of the tire 8 detects the compromised portion 9 of the tire 8, the tire repair material 20, which may be comprised soft polymers in some embodiments that may harden and fill said compromised portion 9, may be applied from a particular bay 21 corresponding to the section of the inside surface 18 of the tire 8 having the compromised portion 9 (utilizing any tire repair material application means, as described for example in further detail below). Once the tire repair material 20 has been applied to the compromised portion 9 of the tire 8, (and also potentially with the assistance of centripetal force in some embodiments) the tire repair material fills in the compromised portion 9 and converts into a relatively more solid state so that the previously-compromised portion is no longer compromised 22 (as shown in FIG. 4D) and air 10 no longer escapes from the tire 8. However, since due to the prior loss of some air, the tire 8 may still be in an at least partially deflated state, an additional step of some method embodiments may also include a means for at least partially inflating 23 the tire 8 with some form of gas 34 after the tire repair material 20 has been applied to punctured portion 9 of the inside surface 18 of the tire 8 so that it has been repaired 22. Thus, as shown in FIG. 4E, the tire 8 may be not only repaired but also returned to an inflated state.

Figure 5C:
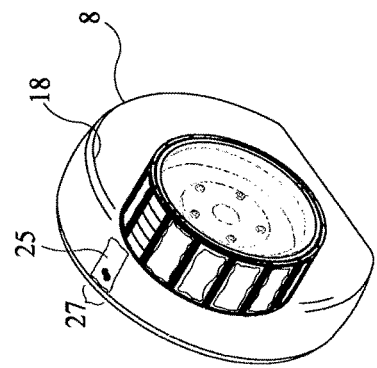
Figure 5B:
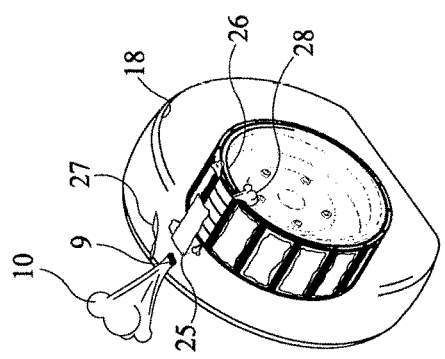

Several variations of device embodiments may be used to accomplish the aforementioned method. For example, FIGS. 5A-5F illustrate several stages of repairing a punctured portion 9 of a tire 8 with air 10 escaping (FIG. 5A) using a first device embodiment 35, where bays 24 utilize propulsion means to propel the tire repair materials 25 (FIG. 5B) from a particular bay 26 to the section 27 of the inside surface 18 of the tire 8 corresponding to the punctured portion 9, as shown in FIG. 5B. For example, in said embodiment shown in FIG. 5B, an explosive reaction may be initiated using air or nitrogen 28 (possibly using a chemical composition comprising one part sodium azide (NaN3) and one part potassium nitrate (KNO3)) sourced also within the bay 26, generating the outward propulsion of the repair materials 25. As shown in FIG. 5C, once the tire repair material 25 has been pushed or propelled outwardly toward the inside surface 18 of the tire 8, and in particular to the section 27 corresponding to the compromised area 9, it may cover the puncture 9 and form a seal over the inside surface 18 of the tire 8, but in the embodiment shown constitute just a first layer of tire repair material 25.

Figure 5F:
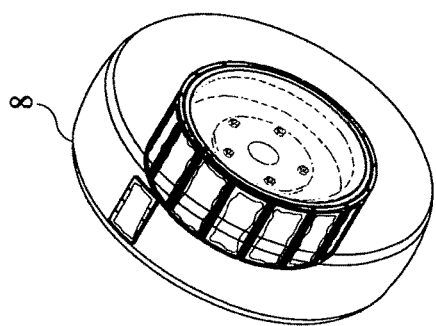
Figure 5E:
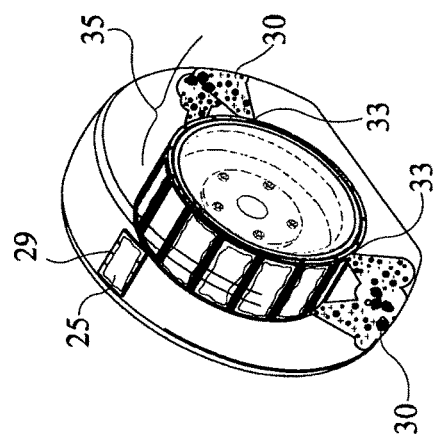
Figure 5D:
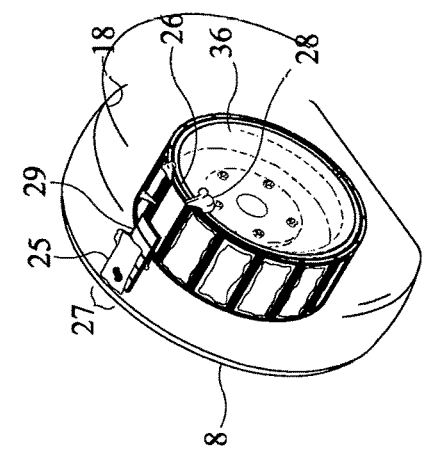

As shown in FIG. 5D, other layers of tire repair material 29 may also be applied in a similar manner and (in some embodiments) in a predetermined sequence. For example, the second or next layer 29 may be applied, which may comprise in some embodiments, for example, slower-setting glue mixed with rubber for elasticity, which may be propelled radially outward from a wheel barrel embodiment reference point 36 toward the first layer of tire repair material 25 now fastened on the inside surface 18 of the tire 8, also using an air or nitrogen 28 mini-explosion toward the same section 27 of the tire 8 corresponding to the punctured portion 9, over where the first layer of tire repair material 25 was already applied. Next, after the second layer of tire repair material 29 has been applied over the first layer 25, as shown in FIG. 5E, filling in any weaknesses in the seal and providing a stronger seal and possibly larger sealed area, the device embodiment 35 shown may also comprise a means for inflating 33 the tire 8 with new air 30, so that the now-repaired tire 8 may be returned to an inflated state as shown in FIG. 5F. In one embodiment (also shown in FIG. 5E), certain bays 37, in addition to storing the layers of tire repair material 25, 29 may also comprise means for inflating 33, such as a reaction that emits nitrogen gas 30.

Figure 6C:
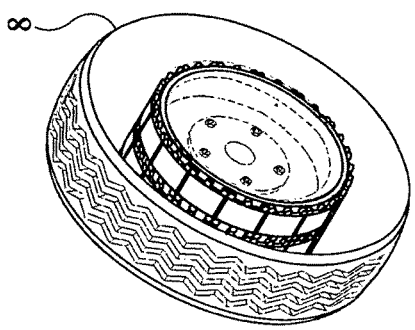
FIGS. 6A-6C illustrate several stages of repairing a punctured tire using a second tire repair device embodiment.
Figure 6B:
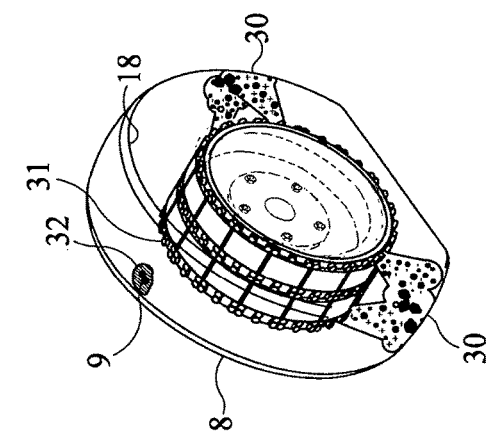
Figure 6A:
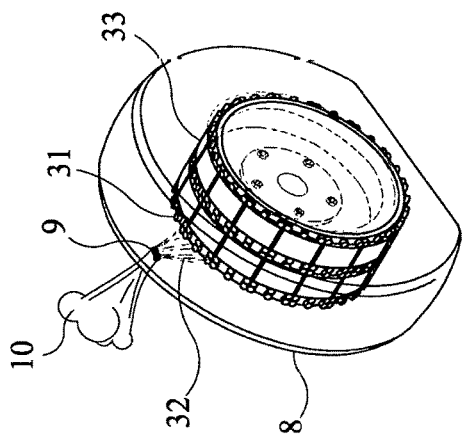

Other means for applying the tire repair material 20 to the inside surface 18 of the tire 8 may also be utilized according to embodiment. For example, as shown in FIGS. 6A-6C, said means for applying the tire repair material may also utilize spraying means 31 for spraying tire repair material 32 towards the compromised portion 9 of the tire 8. Said tire repair material 32 may also vary as to composition according to design and preference and as shown in FIG. 6A may in some embodiments comprise more of a liquid tire repair material 32, as opposed to the more solid tire repair material 25, 29 shown in FIGS. 5A-5F. As shown in FIGS. 6A-6C, said spraying means 31 in some embodiments may be evenly distributed around the circumference of the wheel barrel 33. With the tire repair material 32 applied to the punctured portion 9 of the inside surface 18 of the tire using the spraying means 31, as shown in FIG. 6B, the tire repair material 32 may fill in the punctured portion 9 and harden and seal the puncture 9. In some embodiments the spraying means 31 may also apply a sequence of different types of tire repair material 32 to the punctured portion 9 according to stage of the repair process and also according to puncture 9 size. As shown in FIG. 6C, the tire 8 may also in one embodiment be inflated with additional gas 30 (e.g., air or nitrogen in respective embodiments), and the inflated and repaired tire 8 may therefore be ready for additional traveling in its uncompromised and inflated state.

I claim:

1. A tire-repairing wheel for use with a tire of the type having a hollow tire body that is installable on a wheel, the tire having an inside surface, portions of which are reparably puncturable, the wheel comprising a wheel barrel, so that when the tire is installed on the wheel the inside surface of the tire faces the wheel barrel, the wheel comprising:
   the wheel barrel configured for storing tire repair material; and a tire repair material applying means for applying the tire repair material to at least one portion of the inside surface of the tire; whereby, at least one puncturable portion of the inside surface of the tire is reparable without having to remove the tire from the wheel;
   the wheel further comprising a tire installation facilitating means configured so that neither the wheel barrel configured for storing tire repair material nor the tire repair material applying means interferes with the installation of the tire to the wheel; wherein the wheel barrel comprises a surface that faces the inside surface of the tire when the tire is installed on the wheel, and the tire installation facilitating means comprises at least one closeable opening in the surface of the wheel barrel surface.

2. The wheel of claim 1, wherein the tire installation facilitating means further comprises a means for positioning the tire repair material applying means through the at least one closeable opening in the surface of the wheel barrel into at least one position for applying the tire repair material to at least one portion of the inside surface of the tire.

3. The wheel of claim 2, wherein the tire installation facilitating means further comprises several separable and unifiable concentric arc sections and separation of the sections forms the at least one closeable opening.

4. The wheel of claim 3, wherein the tire installation facilitating means further comprises a levering means for raising at least the tire repair material applying means through the at least one closeable opening.

* * * * *

UNITED STATES PATENT AND TRADEMARK OFFICE
CERTIFICATE OF CORRECTION

PATENT NO. : 9,796,144 B2  
APPLICATION NO. : 14/464671  
DATED : October 24, 2017  
INVENTOR(S) : Ziad Ahmed Mohamed Ali Hussein Elsawah It is certified that error appears in the above-identified patent and that said Letters Patent is hereby corrected as shown below:

On the Title Page

Item (73), should read:
Assignee: Ziad Ahmed Mohamed Ali Hussein Elsawah

Signed and Sealed this
Twenty-fourth Day of March, 2020

Andrei Iancu
*Director of the United States Patent and Trademark Office*